UNITED STATES PATENT OFFICE.

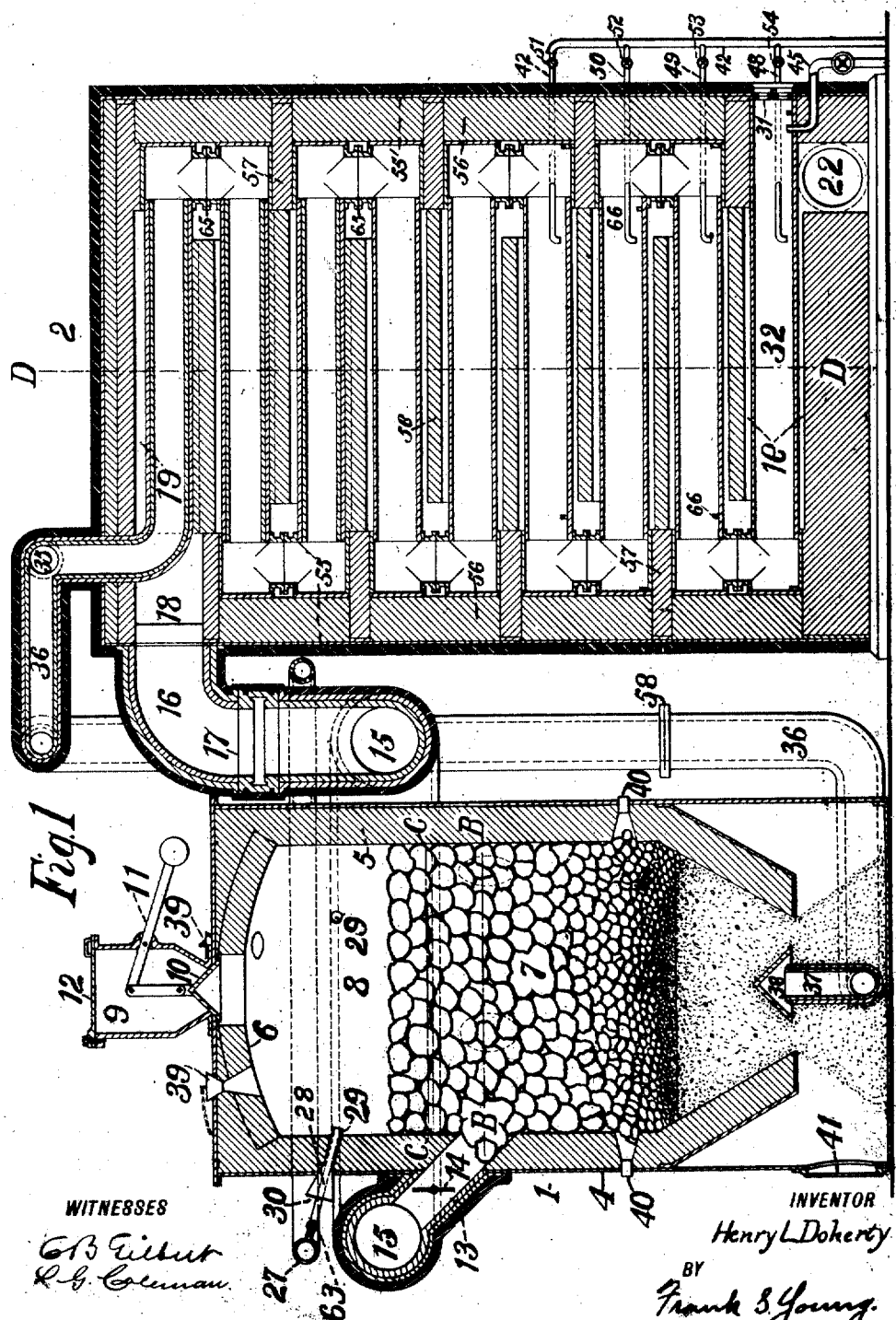

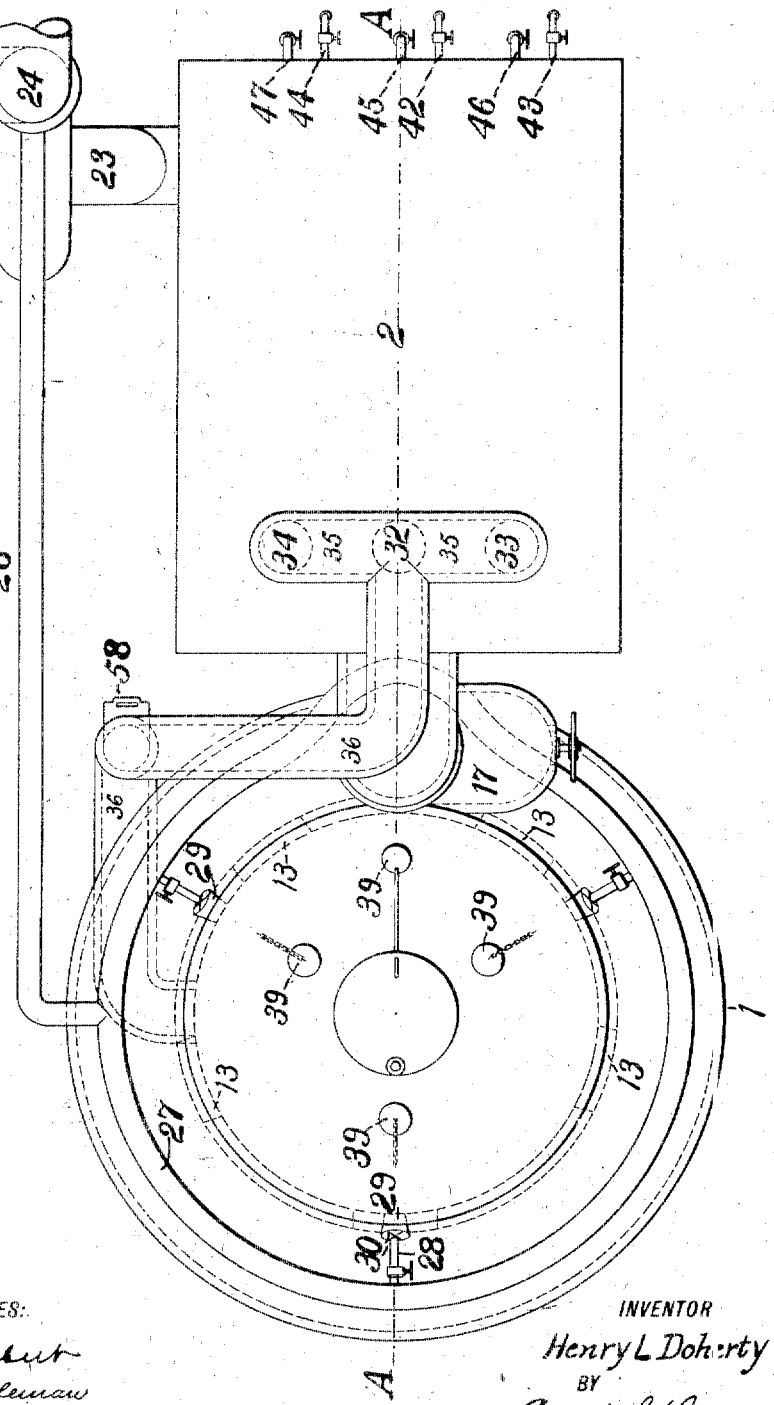

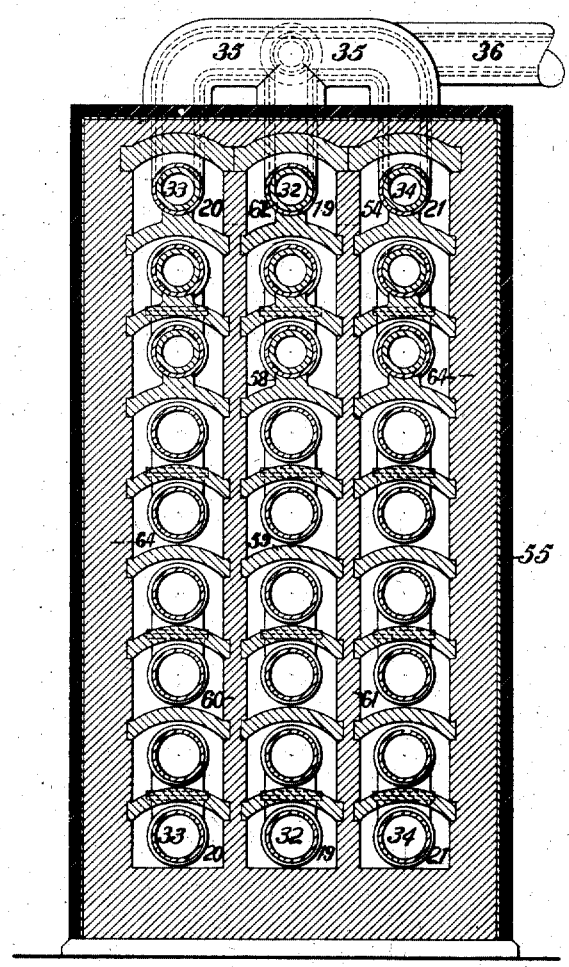

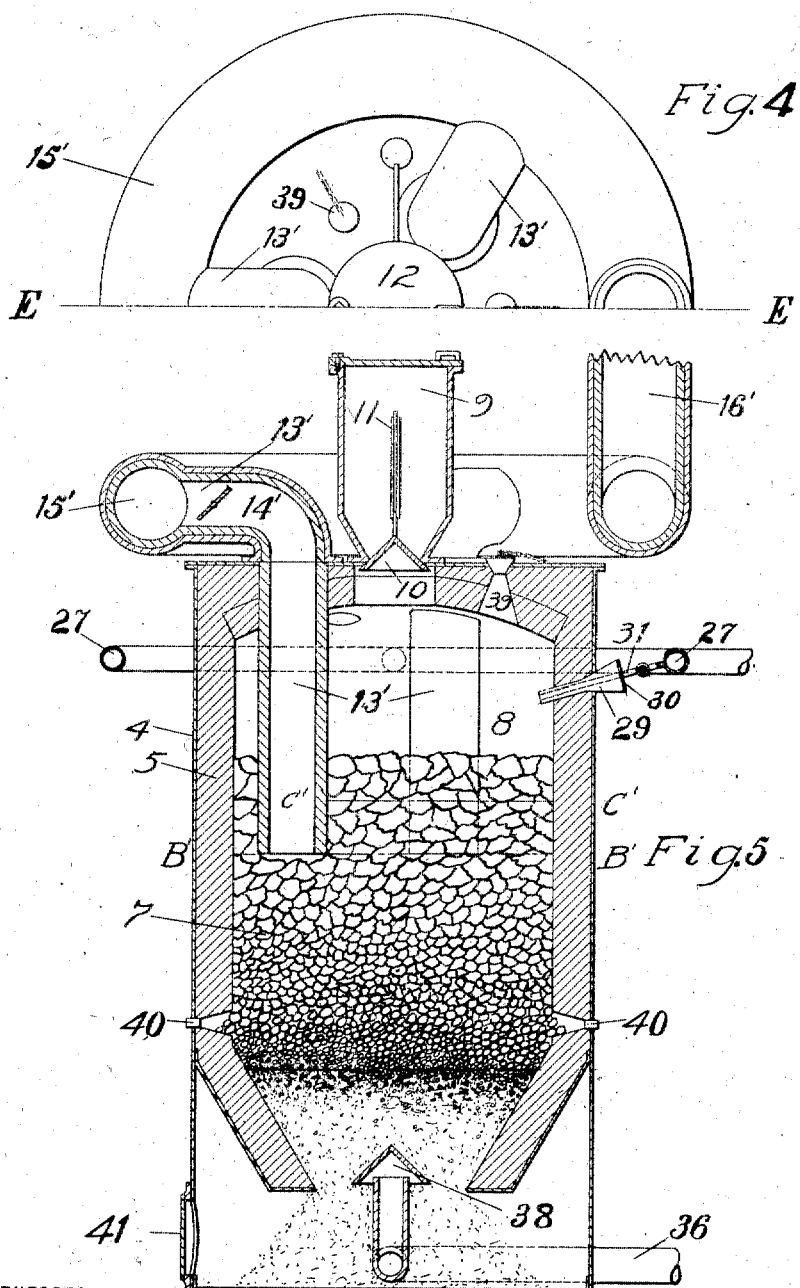

HENRY L. DOHERTY, OF NEW YORK, N. Y.

PROCESS OF MAKING GAS.

1,008,448.

Specification of Letters Patent. Patented Nov. 14, 1911.

Application filed April 7, 1909. Serial No. 488,376.

*To all whom it may concern:*

Be it known that I, HENRY LATHAM DOHERTY, a citizen of the United States, residing at New York city, in the county of New York and State of New York, have invented new and useful Improvements in Processes of Making Gas, of which the following is a specification.

My invention relates to processes for manufacturing gas and, particularly, to that kind of such processes in which a combustible gas is formed by subjecting fuel in a deep bed to combustion by a limited supply of air.

The objects of my invention are the furnishing of a method whereby in gas producing apparatus of the kind mentioned, the freshly charged fuel may be subjected to an igniting and carbonizing temperature immediately after being charged into the producer, the volatile hydrocarbons distilled from the fuel, subjected to a sufficient temperature to "fix" them as permanent gases, by causing them to pass through a considerable depth of incandescent fuel, and the entire bed of fuel in the producer maintained in an active gasifying condition. I attain these objects in the herein revealed process by taking of the gas from the producer below the surface of the fuel bed, preferably at or near the middle thereof and by subjecting the freshly charged fuel to the action of a flame of producer gas.

In the drawings, Figure 1 shows a vertical section through an apparatus suitable for applying my process taken on a vertical plane through the line A A of Fig. 2. Fig. 2 is a plan of the apparatus; Fig. 3, a cross-section of the recuperator on a vertical plane through the line D D of Fig. 1.

In Fig. 4, I show a half plan of a slightly modified form of the producer of the apparatus in which the gas "take off" pipes are located in a vertical position in the producer instead of passing through the sides thereof. Fig. 5 is a section of the same on a vertical plane through the line E E of Fig. 4.

In the drawings 1 is the gas producer, 2 a combined recuperator and evaporator, 3 an exhauster of any common type, 4 the shell of the producer, 5 the fire brick lining and 6 the arch or dome thereof, 7 indicates the fuel chamber of the producer and 8 the upper part of the fuel chamber unoccupied by fuel which in this case is utilized as a combustion chamber in which a portion of the gas made is burned as described below.

9 is the charging hopper of the producer, 10 the bell closing the bottom of the hopper and actuated by a lever mechanism 11, 12 the cover of the charging hopper.

13 indicates the gas offtake pipes which are connected with the common bustle pipe 15, 14 indicates dampers for regulating the draft through the pipes 13.

16 is a pipe or conduit leading the producer gas from the bustle-pipe 15 to the gas distributing flue 18 of the recuperator 2 and is provided with a valve 17.

19, 20 and 21 are three flues opening out of 18 and affording passage for the hot producer gas through the recuperator.

22 is a cross-flue connecting the discharge ends of 19, 20 and 21 and delivering the gas to the suction line 23 of the exhauster 3.

24 is the discharge pipe of the exhauster provided with a valve or damper 25, 26 a pipe opening out of 24 below the valve 25 and leading a portion of the gas back to the gas bustle-pipe 27. Opening out of 27 are a number of short pipes 28 passing through the tubes of the burners 29, these latter having air-dampers 30. Valves 63 on 29 serve to regulate the supply of gas to the burners.

32, 33 and 34 are the air flues of the recuperator 2 located in and enveloped by the gas flues 19, 20 and 21 respectively. The inlet ends of 32, 33 and 34 are provided with dampers 31 which serve to control the main air supply for the producer, the outlet ends of the air flues open into the cross pipe 35, which has a pipe or conduit 36 having a valve 58 opening out of it and conducting the heated air from the recuperator to the twyer 37 of the producer. This twyer has a hood or cover 38 which prevents the entrance of ashes into it.

39 indicates poke holes located in the top of the producer and providing access to the fuel bed thereof. 40 indicates a number of similar openings in the sides or shell of the producer for the purpose of baring down the fuel bed when required.

41 is the ash door of the producer.

42, 43 and 44 are water pipes having four tiers of branch-pipes numbered 48, 49 and 50, sets of valves 51, 52, 53 and 54 respectively controlling the flow of water there-through; 55 indicates the metal shell of the recuperator, 64 the refractory walls thereof, 56 the refractory backing of the doors covering the ends of the gas flues. 60 and 61 are division walls which, together with the arches 59, form the gas flues 19, 20 and 21.

57 are arches thrown across between the vertical dividing walls and serving to support the sections of the air flues 32, 33 and 34; 62 indicates refractory linings or tubes which are inserted into such of the metal flues as are subjected to a high temperature with a view of preventing the collapse of the said metal tubes while they are softened under the influence of the high temperature.

The general construction and arrangement of the recuperator is as follows: It consists as mentioned of a metal shell 55, having openings closed by covers or doors 55′ opposite the ends of each couple of sections of gas flues 19, 20 and 21. This shell has a thick inner wall of fire brick 64 and the inclosed space is divided into three compartments by the partition walls 60 and 61. These compartments are subdivided horizontally by the partitions 59 so as to form what is in effect a continuous return bend flue of each compartment. These partitions 59 are preferably formed of special tiles supported by the walls 64, 60 and 61. These partitions 59 are interrupted alternately front and back so as to leave openings establishing communication on the one hand with the section or sub-flue above it and on the other with the one below it. The upper tier of sub-flues open out of the cross flue 18, and the lower tier opens into the cross flue 22. There are thus formed three parallel return-bend flues for the gas, which receive the gas from the conduit 16, and after conducting it through the recuperator, discharge it into the flue 22 leading to the exhauster. Within and enveloped by the flues 19, 20 and 21 are the air flues 32, 33 and 34, which consist of sections of metal pipes connected by T's 65 in such a way as to form three continuous return-bend flues. The lower tiers of these flues have the water connections mentioned above, for the purpose of supplying water to them and dams 66 which insure a shallow layer of water being maintained in the flues. When the supply of water to any flue is greater than the amount of evaporation therein the excess simply runs over the dam 66 and thence down the sides of the connecting T to the section next below. Any excess supplied to the lowest tier runs to waste through the waste pipes 45, 46 and 47. Between the T's 65, and the doors 55′ is a removable or "dry" wall 56 which prevents the high temperature in the interior of the recuperator being communicated to the doors 55′; but, which can be easily removed when the recuperator is not in use for the purpose of repairing or replacing the sections of the flues 32, 33 and 34 when necessary. The outer ends of the lowest sections of 32, 33 and 34 are provided with dampers or registers 31, which control the flow of air to the flues. The upper sections of 32, 33 and 34 connect with the cross flue 35 which as above mentioned, discharges the air to the producer through the pipe 36.

The method of operating is as follows: A bed of incandescent fuel having been built up in the producer in the customary manner, water is run into the lower tiers of the air flues 32, 33 and 34 in recuperator 2, through the connections provided for that purpose, the dampers 31, valves 14, 17, 58 and 25 are opened, all poke holes and ash doors closed, and the exhauster 3 started. This acts to draw off the gas from the producer through the off-take pipes 13, conduit 16, and flues 18, 19, 20, 21, 22 of the recuperator and the suction pipe 23 and discharge it through the pipe 24 to the point of use or to a storage holder when one is used. At the same time air is drawn in through the dampers 31 and passes through the air flues 32, 33 and 34 of the recuperator in a path parallel but opposite in direction to the travel of the hot producer gas at the same time passing through the recuperator. This hot gas enveloping and in contact with the said air flues gives up to the air and water in said flues the greater portion of its sensible heat. In order to secure the highest practicable transfer of heat from the hot producer gas to the draft current for the producer, it is advisable to perform the evaporation as low down in the recuperator as possible. For this reason, the supply of water to the flues is so regulated that the water space in the lowest sections is always maintained full of water. For example, if the evaporation from two tiers of sections is sufficient to supply the requisite quantity of water, I run the water into the second tier from the bottom of the recuperator in sufficient quantity to supply the evaporation and permit a slight drip from the overflows of the lowest sections. If I wish to increase the quantity of water vapor that I am furnishing to the producer I open the valves 52 to the proper degree and close the valves 53. If the evaporation from three tiers of pans is not sufficient I supply the water to the upper tier by opening valves 51 and closing the valves 52, 53 and 54.

It is evident that I may if, I prefer, furnish to each individual section its own independent supply of water, but I prefer instead to supply the entire quantity required for each flue to the uppermost section in use allowing the sections below to be supplied by the overflow of the ones above. The evaporated water mixes with and is absorbed by the air current passing through the flues. When the draft current enters the upper sections of the flues, the mixed air and water vapor is highly superheated. In ordinary working, the producer gas enters the recuperator at a temperature of about 1500° F., and the air water-vapor current leaves it with a temperature of between 1200 and 1300° F. This draft current passes through the pipe 36 and twyer 37 into the fuel bed of the producer. The carbon of the fuel being in a state of incandescence combines with the oxygen in the draft current in the lower layers of the fuel bed to form principally carbon dioxid, according to the reaction, $$(a)\ C_2 + 2O_2 = 2CO_2.$$

Part of the water of the draft current probably reacts with the carbon of the lower fuel layers also to form carbon dioxid, at the same time setting free its hydrogen, according to reaction.

$$(b)\ C_2 + 4H_2O = 2CO_2 + 4H_2.$$

It is probable that a considerable proportion of the oxygen of the air burns directly to carbon monoxid according to the equation.

$$(c)\ C_2 + O_2 = 2CO.$$

A portion of the water may also react to form carbon monoxid and hydrogen directly according to reaction.

$$(d)\ C_2 + 2H_2O = 2CO + 2H_2.$$

As the draft current passes through the upper layers of incandescent fuel, the carbon dioxid which it carries reacts with the carbon to form carbon monoxid according to reaction.

$$(e)\ 2CO_2 + C_2 = 4CO.$$

The greater part of the water of the draft curent is also here dissociated to form carbon monoxid and hydrogen according to reaction $(d)$.

After the exhauster has been started, the valves 63 are opened, permitting a portion of the producer gas discharging through 24 to pass back to the producer above the fuel bed thereof. The dampers 30 are opened and the gas and air entering through 29 burns. The burning producer gas raises the chamber 8 to a comparatively high temperature. When a fresh charge of coal is introduced into the producer it is immediately, therefore, subjected to a carbonizing temperature. It's volatile matter rapidly distils off and, in passing through the upper portion of the bed of incandescent fuel, the hydrocarbons are cracked and converted for the most part, into permanent gases.

By admitting the proper excess of air through the dampers 30, a greater or less proportion of the distillation gases from the raw coal and also some of the fixed carbon of the latter may be burned if desired. In fact, I prefer to sustain the temperature of the upper part of the fuel bed (above the line B B), in part, by such a combustion.

In my present invention, the upper portion of the fuel bed, above the line B B, is, without the influence of the flame of burning producer gas, subjected to practically the same conditions as the upper portion of the fuel bed in a down draft producer. Without the flame of burning producer gas the upper part of the fuel bed (above the line C C) would be comparatively cool, since all the heat that it would receive would be such as would be conducted back against the draft current entering at the top. The freshly charged fuel would, therefore, simply lie on top of the burning fuel, being subjected only to the slow carbonizing action of the heat received from the burning fuel below. It would be only when it had descended to the zone of active combustion that it would be actually carbonized and ignited. In the type of producer which I have herein shown, this distillation of the volatile hydrocarbons of the coal would take place so far down in the fuel bed (about 10 inches below the surface) that they would be subjected to only a very short travel in contact with the incandescent carbon. The result would be that a considerable proportion of such hydrocarbons would pass off with the gas as vapors and be condensed in the recuperator, in this case, or in whatever form of cooler might be used in others, resulting in a gradual stoppage of the apparatus and lowering of its efficiency due to the tarry deposits formed therein.

By burning a portion of the gas made in contact with the latest charged layers of fuel, I avoid, for the most part, such passage of hydrocarbon vapors through the fuel bed and keep my recuperator almost entirely free from tar. The heat of the burning gas keeps the whole upper portion of the fuel bed at incandescence, and, therefore, in a reactive condition. As I stated above, I prefer to supplement the heat generated by the gas by burning a portion of the fuel itself by admitting a corresponding excess of air through the dampers 30.

The carbon dioxid formed from the burning gas or coal in passing through the incandescent carbon reacts therewith according to reaction.

$$(e)\ 2CO_2 + C_2 = 4CO.$$

This reaction is a heat absorbing or endothermic reaction, as much heat being rendered latent in the dissociation of the carbon dioxid as was liberated in the combustion of the carbon monoxid from which it was formed. The water formed by the combustion of the hydrogen of the producer gas, according to the reaction, $$2H_2 + O_2 = 2H_2O,$$

is also disassociated by passing through the incandescent carbon, according to reaction (d), the same amount of heat being, of course, rendered latent in its disassociation as was developed in the combustion of the hydrogen from which it was formed. I, therefore, do not lose any heat from the system by thus returning a part of the gas to the producer and burning it therein, save such as is lost by conduction from the top and sides of chamber 8. The heat which is developed by the burning of the producer gas is absorbed in a useful form in reaction (e). The net result of this device is, therefore, that I am taking heat from the interior of the fuel bed where there is a surplus and restoring it to the surface layer thereof in which there is, ordinarily, no combustion. I thus keep the entire bed of fuel in a reactive condition.

In the operation of a gas producer the depth of the fuel bed is limited, practically by the resistance which the bed offers to the passage of the blast current. Aside from this restriction, the greater the depth of fuel in a reactive condition, the greater is the amount of carbon that may be gasified per square foot of grate surface. Now, since by my device I keep the entire bed of fuel at a temperature sufficiently high to permit the carbon to react freely with the chemically active constituents of the draft current, I am securing the greatest possible capacity for my producer. Although I am returning cooled gas to the upper part of the producer, I do not lose the sensible heat which it carried out of the producer because I am restoring such heat through the medium of the air current supplied to the lower part of the fuel bed. I use the cooled gas owing to the fact that it is under pressure, and, therefore, does not require any moving mechanism to re-introduce it into the producer. Were I to use the hot producer gas, it is manifest, that I would have to provide an additional blower or injector to re-introduce the hot gas into the producer, since, even if I were working the producer under pressure instead of suction, the gas passing through the "off-take" would, of necessity, be under a lower pressure than would exist in the chamber 8.

Theoretically, the proper conditions to maintain in a producer are the ones which will give the greatest possible reproduction of the heat of the original fuel in an available form in the apparatus in which the gas is subsequently burned. There are however important practical considerations which modify the proper theoretical conditions in the producer in practice. For instance, the clinkering of the ash of the fuel when a high temperature is maintained in the producer, makes it very difficult to operate the same and entails great irregularity, wear of the producer, and heavy labor in its operation. For these reasons, it is desirable in practice to maintain the temperature of the fuel bed below the point at which the ash of the fuel used will clinker. In my present invention, I secure this temperature control, by regulating the amount of water vapor in the draft current supplied to the producer, in the manner hereinbefore explained. By working part of my fuel bed on a down draft, and the other part on an up draft, it is readily seen that I am enabled to use nearly double the depth of bed that may be used in the ordinary type of gas producer. This means that for the same grate area I can gasify nearly twice as much carbon.

In Figs. 4 and 5 I have shown a slightly different form of apparatus in which the gas "take-offs" are inserted vertically through the top of the producer. In this arrangement there is the advantage that there is no tendency to increase the draft up the sides of the producer such as obtains in the previous arrangement. The arrangement is, however, less desirable in other respects and I regard the first arrangement shown as being the preferable one. It is obvious, however, that the modification is one that does not in any sense change the nature of my invention. In this modification the different parts have the same functions as have the parts designated by the same numbers (without the primes) in the preceding figures.

In several copending applications, filed herewith, I have revealed inventions more or less closely related to the one herein revealed.

I have not herein claimed the apparatus shown and described as that forms the subject matter of a separate application.

Having described my invention, what I claim is:

1. The process of making gas which consists in passing a draft current of commingled air and products of combustion, into one extremity of a bed of incandescent fuel, and simultaneously passing a draft current of commingled air and water vapor into the other extremity of said bed and withdrawing the gas made from the interior of said fuel bed, substantially as described.

2. The process of making gas which consists in charging coal onto the fuel bed of a gas producer, subjecting said coal to a flame of previously formed producer gas, passing the resulting gases downward through the upper part of said fuel bed, simultaneously passing a current of air into the lower part of said fuel bed and withdrawing the gases formed from the interior of said fuel bed, substantially as described.

3. The process of making gas which consists in charging coal onto the fuel bed of a gas producer, subjecting said coal to a flame of previously formed producer gas, passing the resulting gases downward through the upper part of said fuel bed, simultaneously passing a current of air mixed with an endothermically reacting constituent into the lower part of said fuel bed and withdrawing the gases formed from near the middle of said fuel bed, substantially as described.

4. The process of making gas which consists in charging coal onto the fuel bed of a gas producer, subjecting said coal to heating by a flame of previously formed gas from said gas producer, passing the gaseous mixture resulting from the combustion of said gas downward through the upper part of said fuel bed, simultaneously passing a current of air mixed with water vapor into the lower part of said fuel bed, substantially as described.

5. The process of making gas which consists in maintaining a bed of ignited fuel in a gas producer, subjecting the freshly charged fuel on the upper part of said bed to carbonization by directly contacting it with a flame of previously formed gas, passing the gases from the said flame and the distillation gases from the said fuel downward through the upper part of said fuel bed, simultaneously introducing a current of air mixed with an endothermically reacting constituent into the lower part of said fuel bed and withdrawing the gas made from the interior of said fuel bed, substantially as described.

6. The process of making gas which consists in maintaining a bed of ignited fuel in a gas producer, subjecting the freshly charged fuel on the upper part of said fuel bed to carbonization by direct contact with a flame of previously made gas, introducing air and water vapor into the lower part of said fuel bed, applying suction at an interior zone of said fuel bed, whereby the combustion gases from said gas flame and the gases distilled from the fresh fuel are drawn downward through the upper part of said bed of ignited fuel, whereby the water vapor and carbon dioxid of said combustion gases are dissociated by contact with the incandescent carbon of the fuel to form carbon monoxid and hydrogen, and the gases resulting from the combustion in the lowest part of said bed of ignited fuel are drawn upward through the lower half of said bed, and the initially-formed carbon dioxid and the water vapor are in major part dissociated to form carbon monoxid and hydrogen, the gaseous current from the upper part of the fuel bed and the gaseous current from the lower part of the fuel bed united and passed through a recuperator, whereby part of the sensible heat of the producer gas is transferred to the draft current supplied to said gas producer, substantially as described.

7. In a suction operated gas producer the process which consists in working the upper part of the fuel bed by down-draft, the lower part of said bed by up-draft, the uppermost layer of fuel of said bed being subjected to direct contact with a flame of previously made gas at the same time, the lower part of said fuel bed to combustion by a draft current of commingled air and a constituent reacting endothermically with incandescent carbon, the volume and velocity of the draft being so regulated that the combustion of the carbon in the lower part of said fuel bed is substantially to carbon monoxid, substantially as described.

Signed at New York city, in the county of New York and State of New York this 31st day of March 1909.

HENRY L. DOHERTY.

Witnesses:
 LOUIS F. MUSIL,
 C. B. GILBERT.